(12) United States Patent
Chen

(10) Patent No.: US 7,891,638 B2
(45) Date of Patent: Feb. 22, 2011

(54) WATER CONTROL VALVE CORE WITH A SEGMENTED LOCKING FUNCTION

(75) Inventor: Mei-Li Chen, Tanzih Township, Taichung County (TW)

(73) Assignee: Kuching International Ltd., Tanzih Township, Taichung County (TW)

( * ) Notice: Subject to any disclaimer, the term of this patent is extended or adjusted under 35 U.S.C. 154(b) by 441 days.

(21) Appl. No.: 12/060,369

(22) Filed: Apr. 1, 2008

(65) Prior Publication Data
US 2009/0242811 A1 Oct. 1, 2009

(51) Int. Cl.
*F16K 31/44* (2006.01)

(52) U.S. Cl. ............... 251/238; 251/115; 137/625.17

(58) Field of Classification Search ......... 251/111, 251/114–116, 236–238, 242, 205, 297, 284; 137/625.17, 801, 636.2–636.3, 625.4
See application file for complete search history.

(56) References Cited

U.S. PATENT DOCUMENTS

| 5,522,429 | A  | * | 6/1996 | Bechte et al. | ............ 137/625.17 |
| 6,796,544 | B1 | * | 9/2004 | Chen | ........................ 251/205 |
| 7,357,154 | B1 | * | 4/2008 | Chen | ..................... 137/625.17 |
| 2006/0144449 | A1 | * | 7/2006 | Cattaneo | ................ 137/625.17 |
| 2006/0186364 | A1 | * | 8/2006 | Schwarzer et al. | .......... 251/111 |

* cited by examiner

*Primary Examiner*—John K Fristoe, Jr.
*Assistant Examiner*—Marina Tietjen
(74) *Attorney, Agent, or Firm*—Egbert Law Offices PLLC

(57) ABSTRACT

The present invention provides a water control valve core with a segmented locking function. The invention includes a valve casing, a brake unit, and a water control element. A bottom plate under the tube portion of the seat of the brake unit is placed within the hold tank of the valve casing. A driven portion penetrates the bottom plate. The fixed valve, free valve and driving seat of the water control element are arranged within the hold tank of the valve casing. An upper locking portion is assembled under the bottom plate of the seat of the brake unit; and a collapsible lower locking unit is individually manufactured and then assembled onto the locating portion at top of the driving seat of the water control element. The lower locking unit could be interlocked with the upper locking portion.

5 Claims, 6 Drawing Sheets

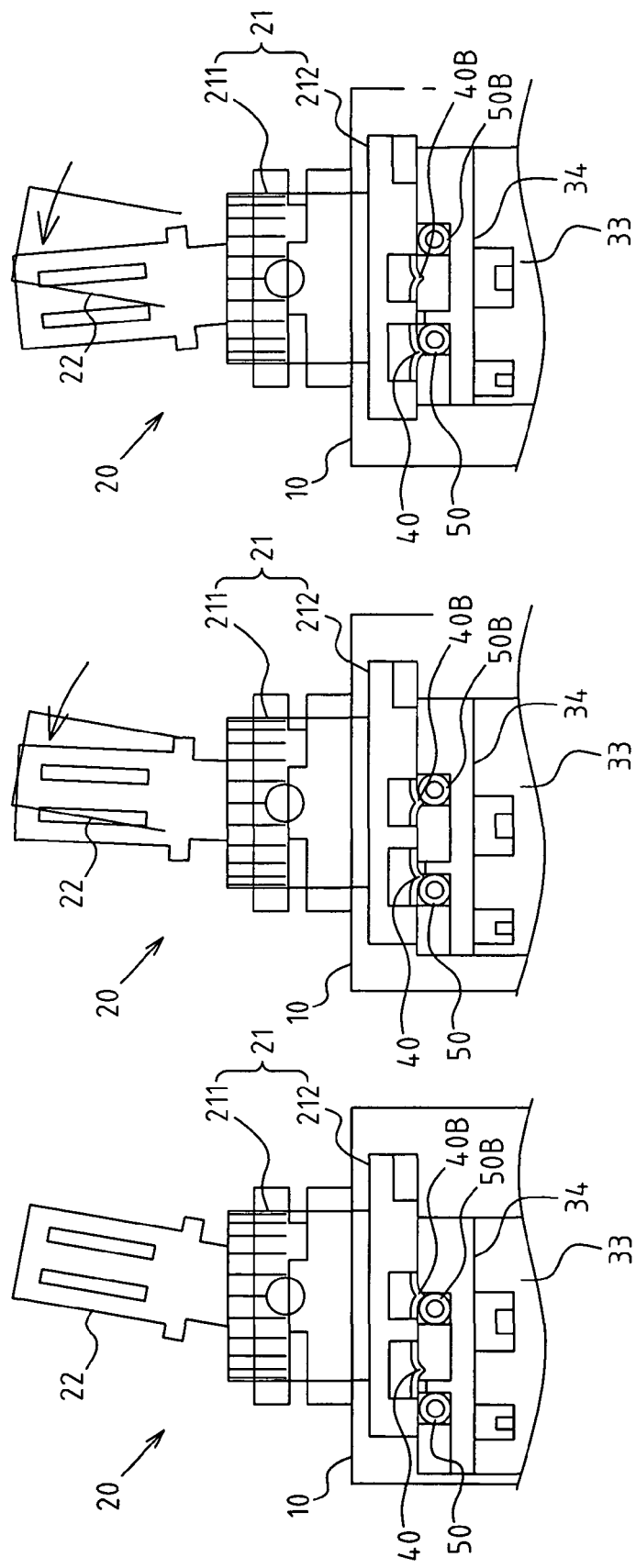

WATER CONTROL VALVE CORE WITH A SEGMENTED LOCKING FUNCTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water control valve core, and more particularly to an innovative core with a segmented locking function.

2. Description of Related Art Including Information Disclosed Under 37 CFR 1.97 and 37 CFR 1.98

The water control valve core is a major element of a hydrant. As for a bithermal hydrant, the water control valve core is generally provided with a swinging valve rod linked with the toggle switch of the hydrant, so that the opening and closing of hydrant could be controlled by coupling the valve rod with the toggle switch. However, when the toggle switch of the hydrant is opened by the operator, maximum water yield may occur quickly due to the extremely short stroke of the toggle switch. Even if the toggle switch is adjusted manually to get a smaller water yield, it is difficult to stably fix the toggle switch, so water yield will be likely changed, leading to waste of water resources in the event of bigger water yield of the hydrant.

To this end, a water control valve core with segmented locking function is developed, so that the swinging position of the valve rod could be interlocked for segmentation of the water yield. A flange is prefabricated by the valve rod and corresponding valve core for locking purposes.

The following shortcomings are observed during the actual applications:

1. Said flange must be sufficiently sized to yield the desired locking effect. With the repeated swinging of the valve rod, wear and tear of the flange may occur due to forcible friction during the process of locking. The locking effect will thus be affected or even lost in the case of thinning of the flange. Since the flange is prefabricated by the valve rod and valve core, it is impossible for replacement with single components.

2. The locking strength of the valve rod may vary depending on the different types of toggle switches, specifications of valve cores and customized requirements. The prefabrication of the aforementioned flange cannot be adapted flexibly, leading to higher manufacturing costs and lower economic efficiency.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based upon the innovation of the present invention, an upper locking portion is placed under the bottom plate of the seat of the brake unit, and a collapsible lower locking unit is assembled onto the top of the driving seat of the water control element. The lower locking unit has a cylindrical shape or is made of elastic materials different from the bottom plate of the seat. The lower locking unit rolls or moves elastically when interlocking with the upper locking portion, leading to stronger strength of the interlocking element of the brake rod, a longer service life and improved replaceability.

Since the lower locking unit is of a collapsible type, the local arrangement may be changed depending upon the total configuration quantity, helping to change the locking strength more easily to meet the customized requirements for better economic efficiency.

Based on the structures, the aligned upper locking portion and lower locking unit from different sets are nonsynchronous locking, two or more sections being interlocked to meet diversified customer requirements.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 6 shows a sectional view of the operation of the present invention with two sections being interlocked.

FIG. 7 shows another sectional view of the operation of the present invention with two sections being interlocked.

FIG. 8 shows still another sectional view of the operation view of the present invention with two sections being interlocked.

DETAILED DESCRIPTION OF THE INVENTION

Figure 1:
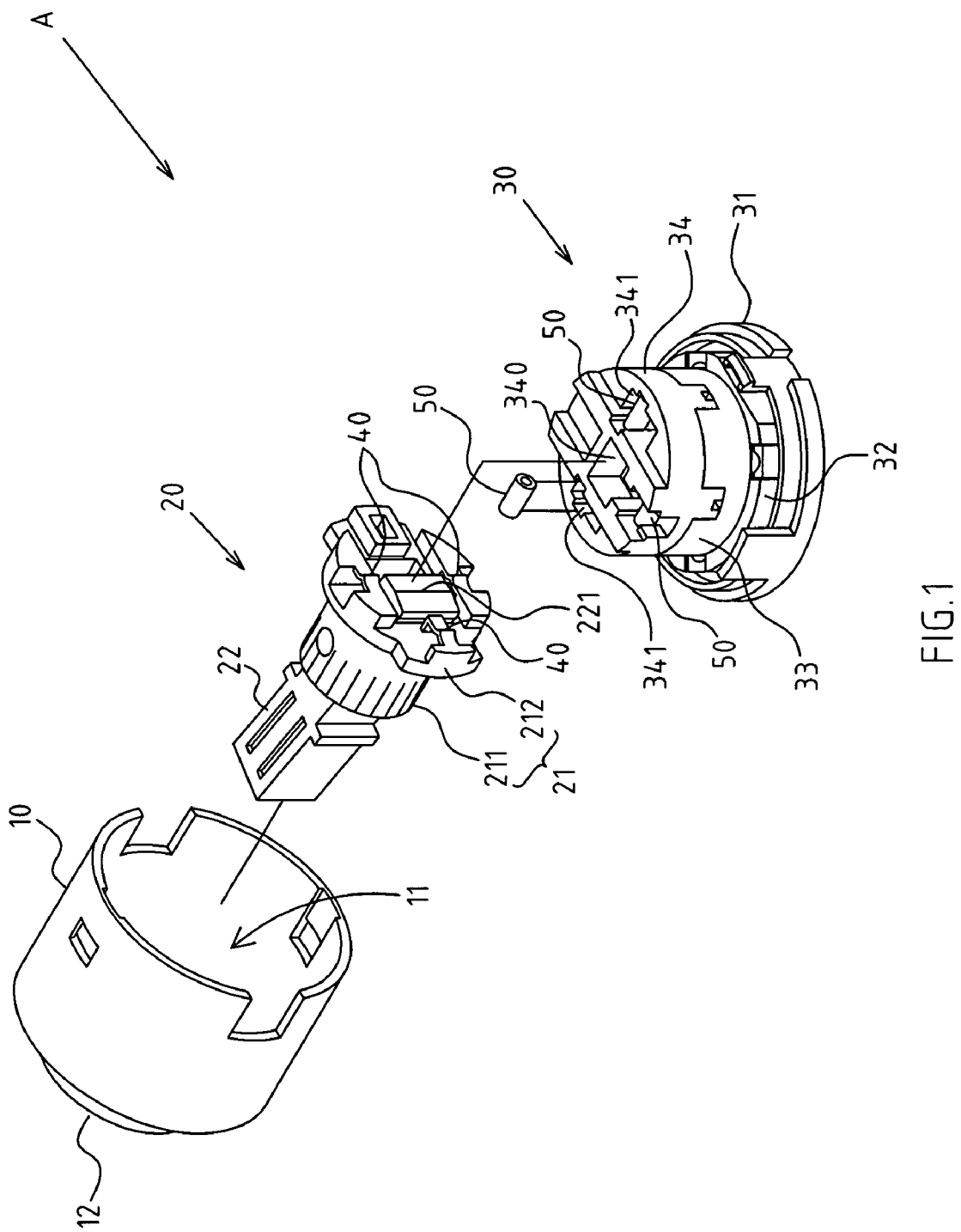
FIG. 1 shows a partially exploded perspective view of water control valve core of the present invention.

The features and the advantages of the present invention will be more readily understood upon a thoughtful deliberation of the following detailed description of a preferred embodiment of the present invention with reference to the accompanying drawings.

FIGS. 1-4 depict preferred embodiments of water control valve core with a segmented locking function. The embodiments are provided only for explanatory purposes with respect to the patent claims.

The water control valve core A includes a valve casing 10, which is a hollow casing with a hold tank 11. A through-hole 12 is placed at top of the valve casing 10.

A brake unit 20 includes a seat 21 and a brake rod 22. A tube portion 211 on the seat 21 penetrates the through-hole 12 of the valve casing 10. A bottom plate 212 under the tube portion 211 is placed on the upper part of the hold tank of the valve casing. Moreover, a driven portion 221 (bulgy or spheric shape) at the bottom of the brake rod 22 penetrates the bottom plate 212.

A water control element 30 includes a base 31, a fixed valve 32, a free valve 33 and a driving seat 34. The base 31 is assembled onto the bottom of the valve casing 10, so the fixed valve 32, free valve 33 and driving seat 34 are arranged within the hold tank 11 of the valve casing 10. The top of the driving seat 34 aligns with the bottom plate 212 of the seat 21 of brake unit 20. A driven portion 340 (a trough) on top of the driving seat 34 could be adapted with driven portion 221 of the brake rod 22, so the driving seat 34 could be shifted transversely with the brake rod 22. Moreover, the top of the driving seat 34 is provided with at least a locating portion 341, which is of a groove shape.

An upper locking portion 40 is assembled under the bottom plate 212 of the seat 21 of the brake unit 20. The upper locking portion 40 of the preferred embodiment is a V-shaped plate formed between two flanges under the bottom plate 212.

A collapsible lower locking unit 50 is individually manufactured and then assembled onto the locating portion 341 at top of the driving seat 34 of the water control element 30. The lower locking unit 50 could be interlocked with the upper locking portion 40. The lower locking unit 50 of the preferred embodiment is of a plastic cylindrical shape.

The aligned upper locking portion 40 and lower locking unit 50 from different sets could be locked synchronously.

Figure 4:
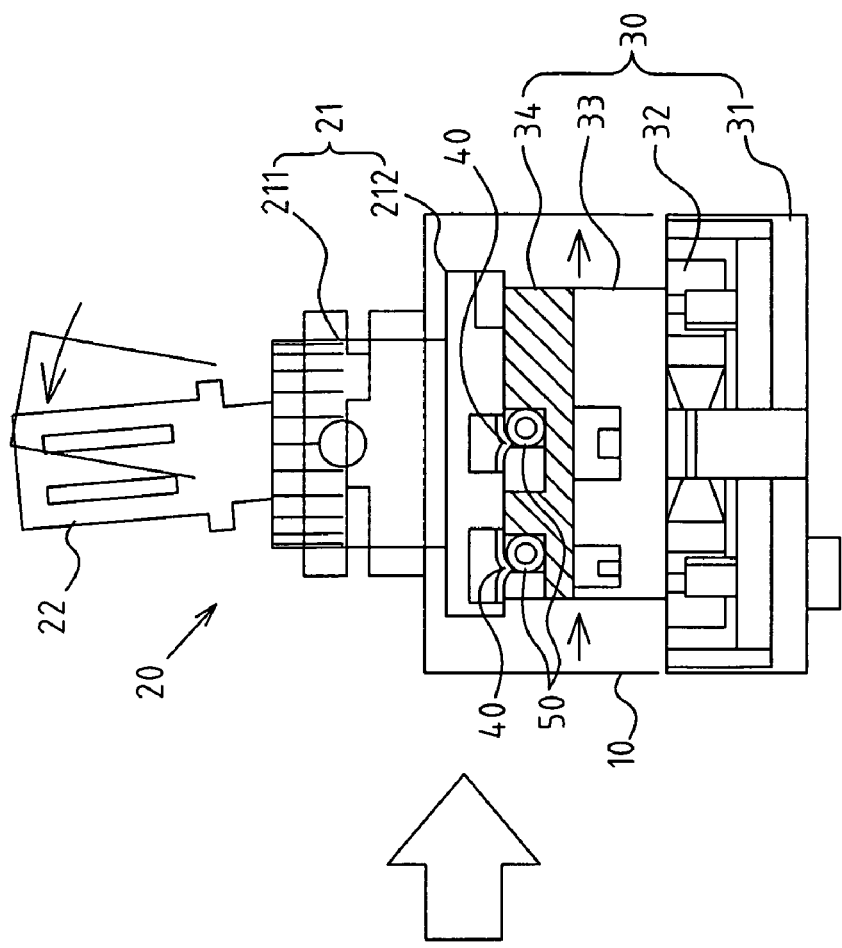
FIG. 4 shows a sectional view of the operation of the present invention.
Figure 4:
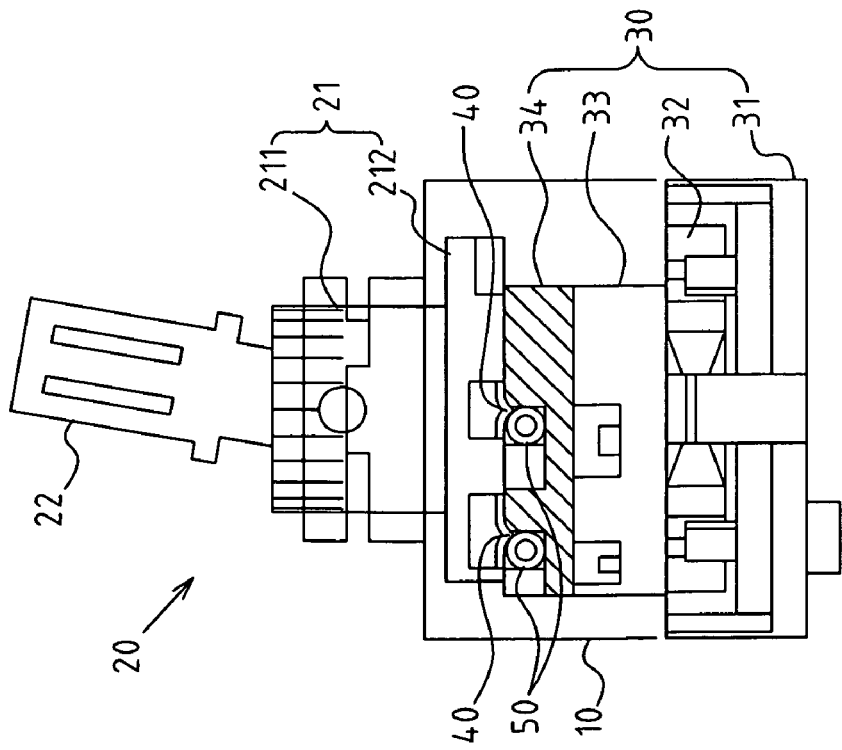
Figure 5:
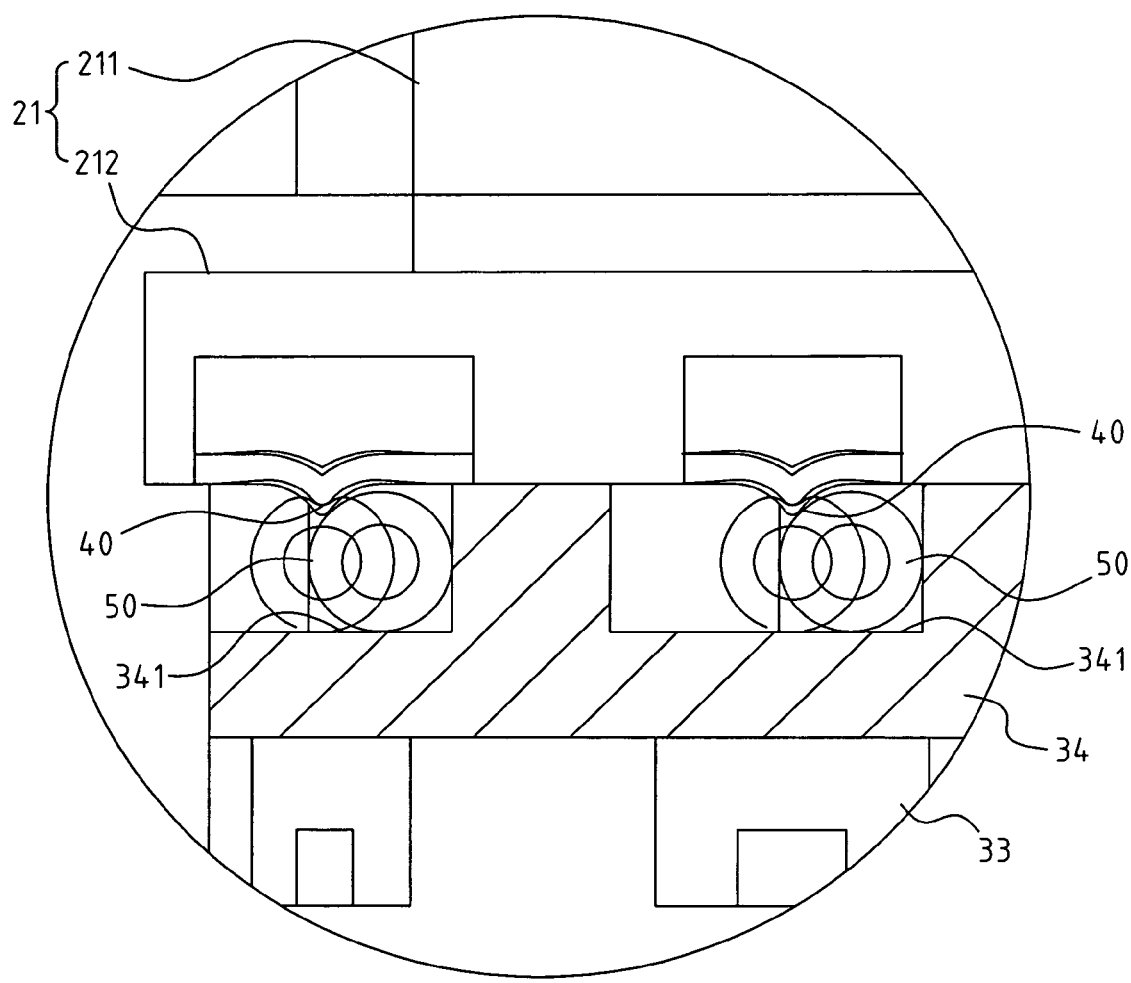
FIG. 5 shows a schematic view of the present invention, showing the upper locking portion and lower locking unit being interlocked.

Based upon above-specified structures, the present invention is operated as follows:

Referring to FIG. 4, the brake rod 22 of the brake unit 20 drives the shift of the driving seat 34 and free valve 33 of the water control element 30 for adjusting water yield. When the brake rod 22 is swung from water stop angle to a preset location with maximum water yield angle, the upper locking portion 40 on the bottom plate 212 of the seat 21 will be blocked by lower locking unit 50 at top of the driving seat 34, so the operator will find it difficult to turn the switch of the hydrant to the maximum water yield position. When the maximum water yield mode is to be used, a bigger force will be applied to the switch of the hydrant, enabling the brake rod 22 to swing to maximum water supply angle. In such case, the upper locking portion 40 will forcibly span over the lower locking unit 50 (shown in FIG. 5) for locking purposes. So, bigger and smaller water yield could be distinguished from the switch of the hydrant, thus helping to save the water resources efficiently.

The aligned upper locking portion and lower locking unit from different sets could also be locked asynchronously for locking of two or more sections. Referring to FIG. 6, the spacing between upper locking portion 40 and lower locking unit 50 in the left side differs from that between upper locking portion 40B and lower locking unit 50B in the right side. Referring to FIG. 7, when the brake rod 22 of the brake unit 20 is swung to the first preset water yield angle, the upper locking portion 40B and lower locking unit 50B in the right side will be locked first. Referring also to FIG. 8, when the brake rod 22 of the brake unit 20 is swung to the second preset water yield angle, the upper locking portion 40 and lower locking unit 50 in the left side will then be locked.

Figure 2:
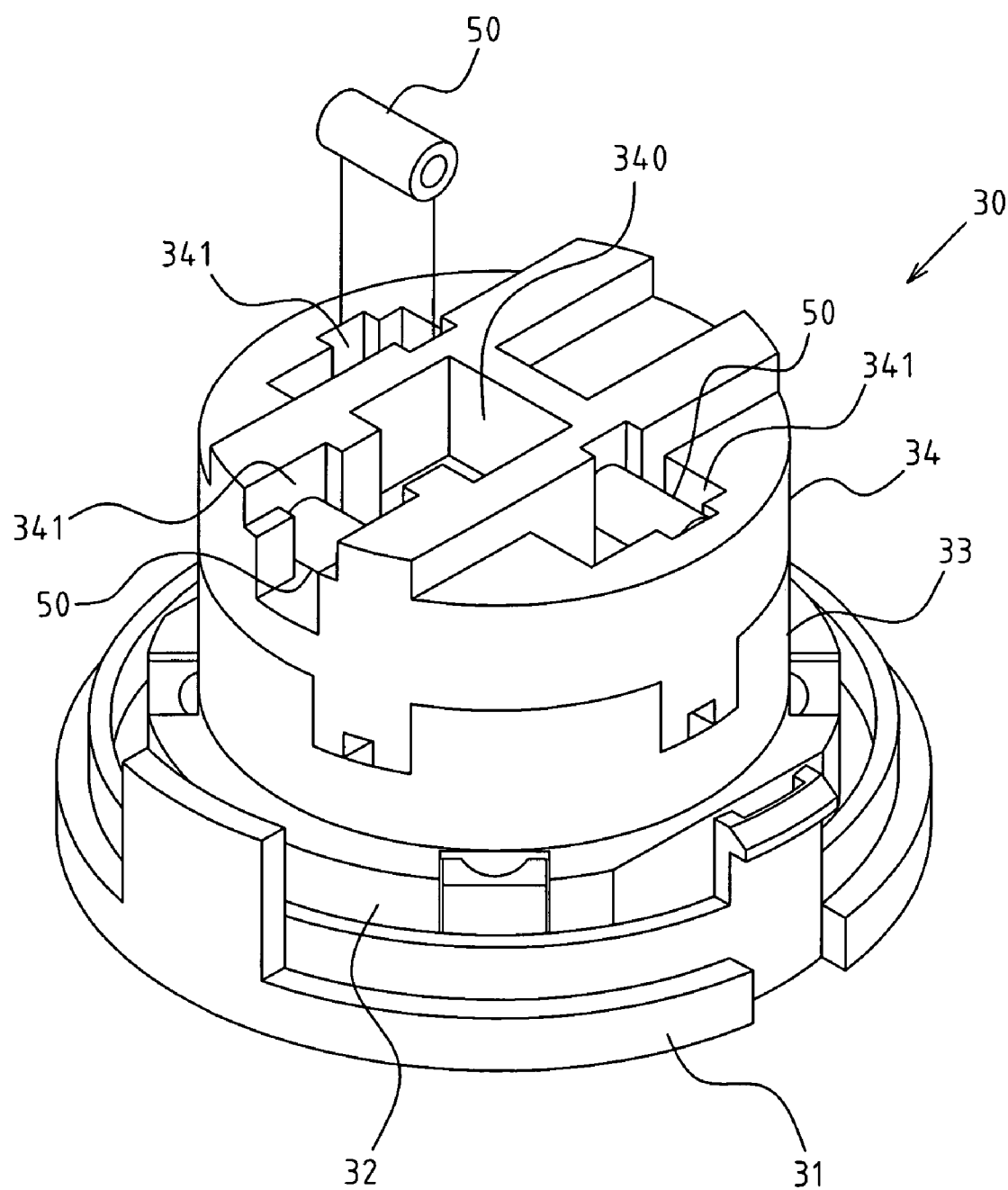
FIG. 2 shows a partially enlarged perspective view of the present invention.
Figure 3:
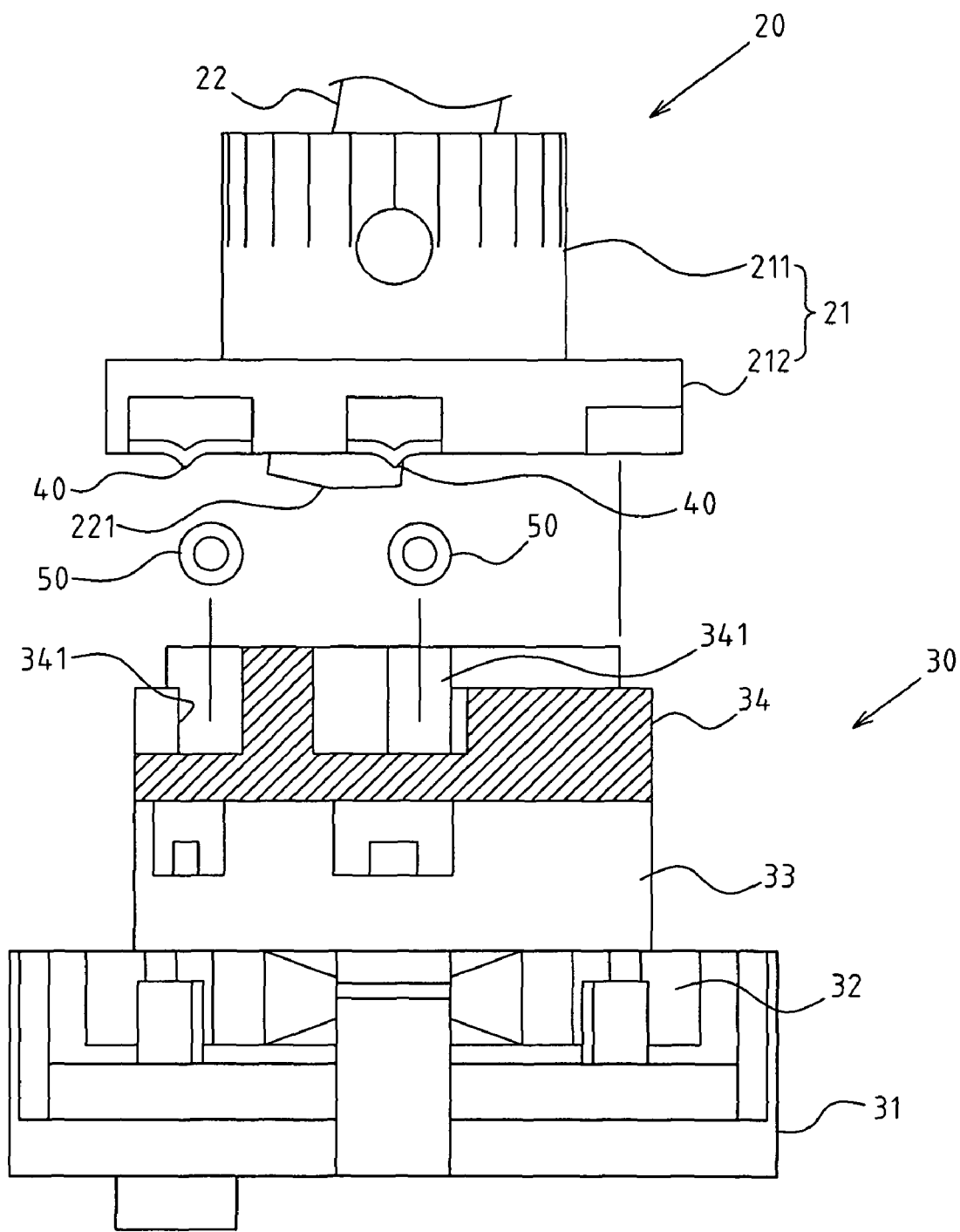
FIG. 3 shows a partial sectional view of water control valve core of the present invention.

Additionally, since the lower locking unit 40 is of a collapsible type, the local arrangement may be changed depending upon the total configuration quantity. Referring to FIG. 2, the lower locking unit 40 is configured with three sets (triangular configuration). Alternatively, one or two sets of lower locking units 40 could be assembled according to the intended locking strength, thus achieving the purpose of changing the locking strength flexibly.

I claim:

1. A water control valve core apparatus having a segmented locking function, the apparatus comprising:
    a hollow valve casing having a hold tank, said valve casing having a through-hole at a top thereof;
    a brake unit having a seat and a brake rod, said seat having a tube portion thereon, said tube portion extending through said through-hole of said valve casing, said tube portion having a bottom plate thereunder, said bottom plate positioned on an upper part of said hold tank, said brake rod having a drive portion at a bottom thereof, said drive portion extending through said bottom plate;
    a water control element having a base and a fixed valve and a free valve and a driving seat, said base affixed to a bottom of said valve casing, said fixed valve and said free valve and said driving seat positioned in said hold tank of said valve casing, said driving seat having a top aligned with said bottom plate of said seat of said brake unit, said driving seat having a driven portion at a top thereof adapted to said driven portion of said brake rod, said driving seat having at least one locating portion of the top thereof;
    at least one upper locking portion assembled under said bottom plate of said seat of said brake unit; and
    at least one collapsible lower locking unit assembled onto the locating portion at the top of said driving seat, the lower locking unit interlockable with the upper locking portion, the lower locking unit being of a cylindrical shape.

2. The apparatus of claim 1, the locating portion being a groove.

3. The apparatus of claim 1, the upper locking portion being a V-shaped plate formed between a pair of flanges.

4. The apparatus of claim 1, the upper locking portion and the lower locking portion being aligned and synchronously locked.

5. A water control valve core apparatus having a segmented locking function, the apparatus comprising:
    a hollow valve casing having a hold tank, said valve casing having a through-hole at a top thereof;
    a brake unit having a seat and a brake rod, said seat having a tube portion thereon, said tube portion extending through said through-hole of said valve casing, said tube portion having a bottom plate thereunder, said bottom plate positioned on an upper part of said hold tank, said brake rod having a drive portion at a bottom thereof, said drive portion extending through said bottom plate;
    a water control element having a base and a fixed valve and a free valve and a driving seat, said base affixed to a bottom of said valve casing, said fixed valve and said free valve and said driving seat positioned in said hold tank of said valve casing, said driving seat having a top aligned with said bottom plate of said seat of said brake unit, said driving seat having a driven portion at a top thereof adapted to said driven portion of said brake rod, said driving seat having at least one locating portion of the top thereof;

at least one upper locking portion assembled under said bottom plate of said seat of said brake unit; and at least one collapsible lower locking unit assembled onto the locating portion at the top of said driving seat, the lower locking unit interlockable with the upper locking portion, the upper locking portion and the lower locking portion being locked nonsynchronously.

* * * * *